(12) United States Patent
Zhang et al.

(10) Patent No.: US 8,988,671 B2
(45) Date of Patent: Mar. 24, 2015

(54) BOTDA SYSTEM THAT COMBINED OPTICAL PULSE CODING TECHNIQUES AND COHERENT DETECTION

(71) Applicant: Nanjing University, Nanjing (CN)

(72) Inventors: Xuping Zhang, Nanjing (CN); Junhui Hu, Nanjing (CN); Lan Xia, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 14/346,955

(22) PCT Filed: Jun. 21, 2013

(86) PCT No.: PCT/CN2013/077639
§ 371 (c)(1),
(2) Date: Mar. 24, 2014

(87) PCT Pub. No.: WO2014/012411
PCT Pub. Date: Jan. 23, 2014

(65) Prior Publication Data
US 2014/0218717 A1    Aug. 7, 2014

(30) Foreign Application Priority Data

Jul. 19, 2012  (CN) .......................... 2012 1 0250190
Apr. 10, 2013  (CN) .......................... 2013 1 0124500

(51) Int. Cl.
*G01N 21/00*      (2006.01)
*G01K 11/32*      (2006.01)
*G01M 11/00*      (2006.01)
*G01D 5/353*      (2006.01)

(52) U.S. Cl.
CPC ........... *G01K 11/32* (2013.01); *G01M 11/3118* (2013.01); *G01M 11/39* (2013.01); *G01D 5/35364* (2013.01); *G01K 2011/322* (2013.01)
USPC ...................................................... 356/73.1

(58) Field of Classification Search
USPC .......................................... 356/72–73.1, 32
See application file for complete search history.

(56) References Cited

U.S. PATENT DOCUMENTS 8,077,314 B2 * 12/2011 Davies et al. ................. 356/344

* cited by examiner

*Primary Examiner* — Abdullahi Nur
(74) *Attorney, Agent, or Firm* — Tianhua Gu; Global IP Services

(57) ABSTRACT

A BOTDA system that combined optical pulse coding techniques and coherent detection includes a narrow linewidth laser, two polarization-maintaining couplers, microwave generator, two electro-optic modulators (EOMs), fiber under test, an optical circulator, a 3 dB coupler, a polarization scrambler, a pulse generator, a balance photodetector, an electrical spectrum analyzer, digital signal processing unit and a frequency shifter. The optical pulse coding techniques and coherent detection are simultaneously used in the invented system, which can be enhance the signal-to-noise ration (SNR), the measuring accuracy and the sensing distance of BOTDA. Moreover, the proposed system has the capacity of break interrogation.

10 Claims, 2 Drawing Sheets

BOTDA SYSTEM THAT COMBINED OPTICAL PULSE CODING TECHNIQUES AND COHERENT DETECTION

CROSS REFERENCE TO RELATED PATENT APPLICATION

The present application is the US national stage of PCT/CN2013/077639 filed on Jun. 21, 2013, which claims the priorities of the Chinese patent applications No. 201210250190.3 filed on Jul. 19, 2012 and No. 201310124500.1 filed on Apr. 10, 2013, which applications are incorporated herein by reference.

FIELD OF THE INVENTION

The invention relates to the field of distributed optical fiber sensing based on Brillouin scattering, in which optical pulse coding techniques and coherent detection are simultaneously used.

BACKGROUND OF THE INVENTION

Compared with the other distributed fiber sensors, Brillouin optical time-domain analyzer (BOTDA) sensors that based on stimulated Brillouin scattering is the sensing technology with the long distance, high measurement precision in temperature and strain sensing, which has shown tremendous application in structural health monitoring (SHM) of large-scale civil engineering, communication optical cables, oil and gas pipeline. In BOTDA systems, a continuous-wave (CW) probe signal interacts with a counter-propagating optical pump pulse through an acoustic wave in the fiber due to stimulated Brillouin scattering (SBS), leading to power transfer between the two optical signals. The CW probe light is locally amplified or reduced via SBS interaction when the frequency offset of these two optical beams is within the fiber Brillouin gain spectrum (BGS). The maximum SBS interaction occurs when the frequency difference equals to the Brillouin frequency shift (BFS) of the fiber. Exploiting the dependence of the BFS parameter on strain and temperature, BOTDA could realize accurately distributed measurements along the fiber under test (FUT).

Optical time domain reflectometer based on coherent detection (COTDR) is the technology that using coherent detection to detect the Rayleigh scattering signal. This detection method can effectively restrain the impact of spontaneous emission noise (ASE) on the power of Rayleigh scattering signal, and the COTDR is very suitable in long distance link detection such as submarine optical fiber cable that with multiple optical fiber amplifiers. COTDR is widely applied in monitoring the loss, the fault point, the connection point and the break of a extra-long distance fiber link. It is an indispensable tool for monitoring the Trans Pacific submarine cable.

Due to the nonlocal effects induced by the pump depletion and the limitation of the maximum allowed input power of the probe signal and the pump light, the performance of traditional BOTDA that using the direct detection is greatly limited. The sensing length of traditional BOTDA is less than 40 km. In addition, a fatal drawback in BOTDA is the requisite of access to both fiber-ends. This implies that the BOTDA doesn't work when a break occurs along the FUT, which extremely limited the application field of the BOTDA. However, with the development of the electric power transmission network, the increasing in the structural health monitoring (SHM) of large-scale civil engineering and the demand in major disaster prevention and control, higher performance of long distance distributed temperature and strain sensing network is required.

SUMMARY

The aim of the present invention is to provide a long distance BOTDA sensing system combined COTDR and coherent detection to replace for the traditional direct detection based BOTDA. The provided BOTDA not only can realize distributed optical fiber temperature or strain sensing, but also can locate the breaks along the fiber link when there is a break in the long distance sensing fiber. The further aim of the present invention is to overcome the drawbacks of low SNR, measuring accuracy and spatial resolution in the aforementioned method and system, and to provide a combined optical pulse coding techniques and coherent detection BOTDA system with the capacity of break interrogation, the provided BOTDA has high gain, long sensing distance and high SNR and measurement accuracy.

To realize the aims aforementioned, the following techniques have been used: A long distance BOTDA sensing system combined COTDR and coherent detection, comprising: a narrow linewidth laser, a first coupler, a second coupler, a microwave generator, an electro-optic modulators (EOM), an optical isolator, long distance sensing fiber, an optical circulator, a 3 dB coupler, a pulse modulator, erbium-doped fiber amplifier (EDFA), a polarization scrambler (PS), a pulse generator, a balance photodetector, an electrical spectrum analyzer and a digital signal processing module. Wherein:

The output of the narrow linewidth laser is divided into two branches by the first coupler: a first branch CW light and a second branch CW light. Wherein:

The first branch is modulated by the pulse generator to generate coded pump pulses via the pulse modulator. Then generated coded pump pulses are amplified at a required optical power level by an Erbium doped fiber amplifier (EDFA) and directed into the first port of the optical circulator after passing the polarization scrambler (PS) and input into the one end of the end B of the long distance sensing fiber through the second port of the optical circulator.

The second branch CW light is again separated into two branches by the second coupler. Wherein, the lower branch CW light is used as the local oscillator light after shifted frequency $f_1$ by an acousto-optic modulator (AOM).

In the upper branch, the probe signal light is generated after a frequency shifting f by the electro-optic modulator (EOM), operating in the suppressed carrier regime, controlled by the microwave generator. The generated probe signal light is two symmetrical sidebands. Then the two sidebands are launched into the A end of the long distance sensing fiber after passing the optical isolator, and then interact with the pump pulses through stimulated Brillouin scattering (SBS). The two interacted probe sidebands passing through the third port of the optical circulator are directed to the 3-dB coupler to mix with the OLO light, and then are detected by the balance photodetector (PD). The output of the balance photodetector (PD) is observed and collected by the electrical spectrum analyzer (ESA), and the digital signal processing module deals with the IF signals from the ESA to obtain the Brillouin gain spectrum and then makes the Lorentz fitting of the obtained spectrum to obtain the Brillouin frequency shift distribution. Finally the distributed optical fiber temperature or strain sensing can be realized using the measured Brillouin frequency shift according to the relations of the Brillouin frequency shift with the temperature or strain.

Further, in the above long distance BOTDA sensing system combined COTDR and coherent detection, the aforementioned pulse generator is used to control the pulse modulator and to give synchronous trigger control for the electrical spectrum analyzer (ESA) simultaneously.

Further, in the above long distance BOTDA sensing system combined COTDR and coherent detection, the aforementioned long distance sensing fiber is more than 70 km ordinary single mode optical fiber.

Further, in the above long distance BOTDA sensing system combined COTDR and coherent detection, when there is a break in the long distance sensing fiber, the pump optical pulses modulated by the pulse modulator are now used as the probe optical pluses, its backward Rayleigh scattering is directed into 3 dB coupler through the third port of the optical circulator and mixed with the OLO, and then is coherent detected by the balance photodetector (PD). The electrical spectrum analyzer (ESA) in zero-span mode is used to acquire time-domain traces of the beat signal for the frequency $f_{IF}=f_1$ and the OTDR power distribution curve can be measured after averaging the data, and break interrogation of the COTDR can be realized.

Further, the above long distance BOTDA sensing system combined COTDR and coherent detection comprises: a first polarization controller between the first coupler and the pulse modulator, a second polarization controller between the second coupler and the electro-optic modulator. Wherein the first polarization controller controls the polarization state of the input light of the pulse modulator, and the second polarization controller controls the polarization state of the input light of the electro-optic modulator.

Further, the above long distance BOTDA sensing system combined COTDR and coherent detection, wherein the frequency shifting f generated by the microwave generator is about a Brillouin frequency shifting of the long distance sensing fiber.

Further, the above long distance BOTDA sensing system combined COTDR and coherent detection, wherein the Brillouin gain spectrum can be measured by scanning the frequency offset of pump pulse and the probe beam through adjusting the modulated frequency f of the microwave generator.

A BOTDA system that combined optical pulse coding techniques and coherent detection, comprising: a narrow linewidth laser, a first polarization-maintaining coupler, a second polarization-maintaining coupler, a microwave generator, fiber under test (FUT), an optical circulator, a 3 dB coupler, a balance photodetector, a polarization scrambler (PS), an electrical spectrum analyzer and a digital signal processing unit. The output of the narrow linewidth laser is divided into two branches by the first polarization-maintaining coupler: a first branch CW light and a second branch CW light. Characterized in that: the BOTDA system also comprising a frequency shifter, a first electro-optic modulators (EOM1), a pulse generator and a second electro-optic modulators (EOM2). Wherein:

The first branch CW light is used as the local oscillator light after shifted frequency $f_1$ by the frequency shifter.

The second branch CW light is again separated into two branches by the second polarization-maintaining coupler (PMC2). The lower branch is modulated by the pulse generator to generate coded pump pulses via the first electro-optic modulator (EOM1). Then generated coded pump pulses are directed into the first port of the optical circulator and input into the one end of the FUT through the second port of the optical circulator.

In the upper branch, the probe signal light is generated after a frequency shifting f by the second electro-optic modulator (EOM2), operating in the suppressed carrier regime, controlled by the microwave generator. The generated probe signal light is two symmetrical sidebands. Then the two sidebands are launched into the other end of the FUT, and then interact with the coded pump pulses through stimulated Brillouin scattering (SBS). The two interacted probe sidebands passing through the third port of the optical circulator are directed to the 3-dB coupler to mix with the OLO light, and then are detected by the balance photodetector (PD). The output of the balance photodetector (PD) is observed and collected by the electrical spectrum analyzer (ESA), and the digital signal processing unit process the IF signals from the ESA to obtain the Brillouin gain spectrum and then makes the Lorentz fitting of the obtained spectrum to get the Brillouin frequency shift distribution. Finally the distributed optical fiber temperature or strain sensing can be realized using the measured Brillouin frequency shift according to the relations of the Brillouin frequency shift with the temperature or strain.

Further, the above BOTDA system that combined optical pulse coding techniques and coherent detection, wherein frequency response range of the balance photodetector is larger than 12 GHz.

Further, the above BOTDA system that combined optical pulse coding techniques and coherent detection, wherein the frequency shifter has more than 80 MHz shifted frequency range.

Further, the above BOTDA system that combined optical pulse coding techniques and coherent detection, wherein the output of the first electro-optic modulator is the coded pump optical pulses with the Hadamard train or Golay complementary sequences.

Further, the above BOTDA system that combined optical pulse coding techniques and coherent detection, when there is a break in the fiber under test (FUT), the coded pump optical pulses with the Hadamard train or Golay complementary sequences outputting from the first electro-optic modulators (EOM1) are now used as the probe optical pluses, its backward Rayleigh scattering is directed into 3 dB coupler through the third port of the optical circulator and mixed with the OLO, and then is coherent detected by the balance photodetector (PD). The electrical spectrum analyzer (ESA) in zero-span mode is used to acquire time-domain traces of the beat signal for the frequency $f_{IF}=f_1$ and the OTDR power distribution curve can be measured after averaging the data, and break interrogation can be realized.

Further, the above BOTDA system that combined optical pulse coding techniques and coherent detection, wherein the digital signal processing unit controls the pulse generator to generate coded electrical pulses with the Hadamard train or Golay complementary sequences, and provide synchronous control for the electrical spectrum analyzer (ESA).

Further, the above BOTDA system that combined optical pulse coding techniques and coherent detection, wherein the Brillouin gain spectrum can be measured by scanning the frequency offset of pump pulse and the probe beam through adjusting the modulated frequency f of the microwave generator.

Further, the above BOTDA system that combined optical pulse coding techniques and coherent detection, the optical pulse coding techniques and coherent detection are simultaneously used in the aforementioned BOTDA system.

Compared with the existing technologies, the invention has the following beneficial effects:

It can enhance the SNR and dynamic range of BOTDA system by using the coherent detection to replace the traditional direct detection method. Without amplification, more than 72 km sensing range is obtained by the invention. The using of the double sideband (DSB) method can mitigate nonlocal effects and improve the measurement accuracy for long distance measurement. Instead of using optical filter to remove the unwanted probe sideband, the coherent detection BOTDA can be easily implemented by choosing the corresponding beat signal, which simplifies and stabilizes the optical structure of the system. Another advantage of our configuration is that the sensor has the capacity of break interrogation as COTDR when the break occurs in sensing fiber, which offers an excellent solution for the requisite of two-end-access in BOTDA, and significantly enhances the robustness of the sensing system.

The present invention simultaneously using the combined method of optical pulse coding techniques and coherent detection can enhance the SNR of BOTDA system, improve the measurement accuracy of temperature and strain and increase the sensing length. The Hadamard train or Golay complementary sequences are used for the coded pump optical pulses, which can enhance both the SNR and spatial resolution of BOTDA. The width of code element can be small enough to the phonon life 10 ns, corresponding to 1 m spatial resolution. The combined methods of optical pulse coding techniques and coherent detection used can endow BOTDA system with the capacity of break interrogation, which offers an excellent solution for the requisite of two-end-access in BOTDA, and significantly enhances the robustness of the sensing system. The invention can realize long distance temperature or strain sensing and be capable of locating the break along the fiber link when there is a break in the fiber under test (FUT). The invention simultaneously shows that the high spatial resolution, improved measurement accuracy, long sensing length and high SNR.

BRIEF DESCRIPTION OF THE DRAWINGS

In FIG. 1: 9-frequency shifter, 10-narrow linewidth laser, 11-first polarization-maintaining coupler, 12-second polarization-maintaining coupler, 13-first electro-optic modulator (EOM1), 14-pulse generator, 15-second electro-optic modulator (EOM2), 16-polarization scrambler (PS), 17-microwave generator, 18-fiber under test (FUT), 19-optical circulator, 20-3 dB coupler, 21-balance photodetector, 22-electrical spectrum analyzer (ESA), 23-digital signal processing unit.

In FIG. 2: 30-a narrow linewidth laser, 31-the first coupler, 32-the second coupler, 33-first polarization controller, 34-a microwave generator, 35-an electro-optic modulators (EOM), 36-an optical isolator, 37-long distance sensing fiber, 38-an optical circulator (38), 39-a 3 dB coupler, 40-the second polarization controller, 41-a pulse modulator, 42-erbium-doped fiber amplifier (EDFA), 43-a polarization scrambler (PS), 44-a pulse generator, 45-a balance photodetector, 46-an electrical spectrum analyzer, 47-a digital signal processing module.

DETAILED DESCRIPTION OF THE PREFERRED EMBODIMENTS

In the following description, numerous details are set forth to provide an understanding of the present invention. However, it will be understood by those skilled in the art that the present invention may be practiced without these details and that numerous variations or modifications from the described embodiments are possible.

Figure 1:
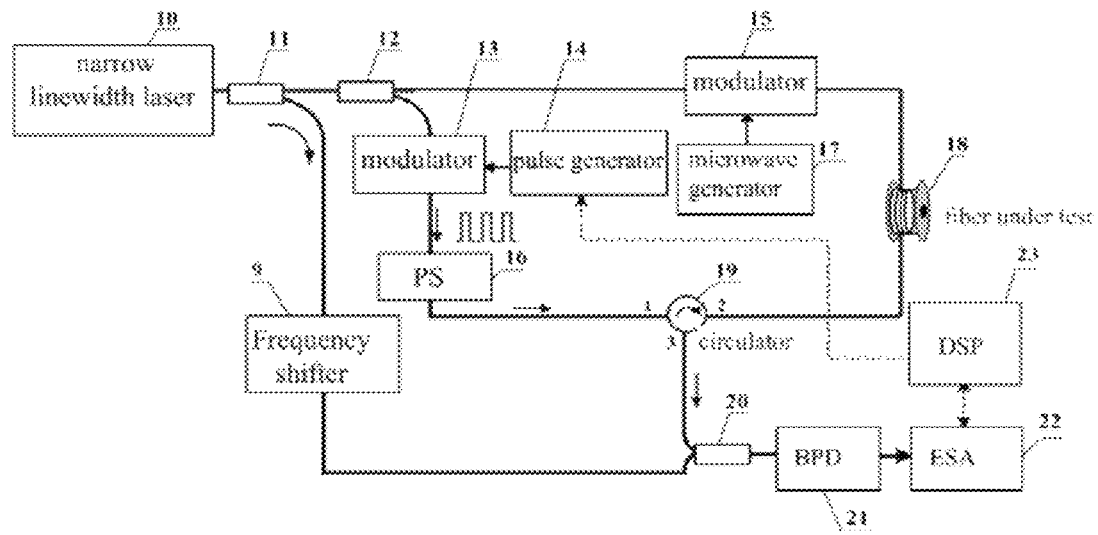
FIG. 1 is a block diagram of an example BOTDA system that combined optical pulse coding techniques and coherent detection.

As shown in FIG. 1, an example BOTDA system that combined optical pulse coding techniques and coherent detection includes a frequency shifter 9, a narrow linewidth laser 10, a first polarization-maintaining coupler 11, a second polarization-maintaining coupler 12, a first electro-optic modulator (EOM1) 13, a pulse generator 14, a second electro-optic modulator (EOM2) 15, a polarization scrambler (PS) 16, a microwave generator 17, fiber under test (FUT) 18, an optical circulator 19, a 3 dB coupler 20, a balance photodetector 21, an electrical spectrum analyzer (ESA) 22, a digital signal processing unit 23.

Assuming the optical frequency of the narrow linewidth laser (3 dB linewidth is less than 1 MHz) 10 is $f_0$. The output of the laser 10 is divided into two branches by the first polarization-maintaining coupler 11: a first branch CW light and a second branch CW light. The first branch CW light is used as the local oscillator light after shifted frequency $f_1$ by the frequency shifter 9. The second branch CW light is again separated into two branches by the second polarization-maintaining coupler 12. The lower branch is modulated to generate the coded pump optical pulses with the Hadamard train or Golay complementary sequences by the first electro-optic modulator 13. The length of the coded pulse is controlled by the pulse generator 14. Then generated coded pump pulses are directed into the first port of the optical circulator 19 after passing the polarization scrambler (PS) 16 and then are input into one end of the FUT 18 through the second port of the optical circulator 19.

In the upper branch, the probe signal light is generated after a frequency shifting f by the second electro-optic modulator 15, operating in the suppressed carrier regime, controlled by the microwave generator 17. The generated probe signal light is two symmetrical sidebands. Then the two sidebands are launched into the other end of the FUT 18, and then interact with the coded pump pulses through stimulated Brillouin scattering (SBS). The two interacted probe sidebands passing through the third port of the optical circulator 19 are directed to the 3-dB coupler 20 to mix with the OLO light, and then are detected by the balance photodetector 21.

According to the principles of coherent detection, the detectable alternating photocurrent of the beat signals outputting from the balance photodetector 21 is:

$$i_{det}(t) = 2R\sqrt{P_L P_p (1 + g_{SBS}(v_s, z))^2} \times \cos(2\pi f_{IF} t + \Delta\phi)$$

Where, $g_{SBS}$ is the stimulated Brillouin gain, R is the responsibility of the balance photodetector (PD) 21, $P_L$ and $P_p$ are powers of the optical local oscillator (OLO) and the probe light, respectively, $f_{IF}$ is the frequency of the beat signal (also called intermediate frequency, IF), $\Delta\phi$ is the phase difference between the optical local oscillator and the probe light. The center frequency of the electrical spectrum analyzer (ESA) 22 is set at intermediate frequency $f_{IF}$ and operating in the "zero-span" mode. The output IF signal of the ESA 22 then are decoded and averaged by the digital signal processing unit 23 to obtain the time-domain power curve of the intermediate frequency $f_{IF}$ signal. The Brillouin gain spectrum can be measured by scanning the frequency offset of pump pulse and the probe beam through adjusting the modulated frequency f of the microwave generator 17. Then the digital signal processing unit 23 makes the Lorentz fitting of the obtained spectrum to get the Brillouin frequency shift distribution. Finally the distributed optical fiber temperature or strain sensing can be realized using the measured Brillouin frequency shift according to the relations of the Brillouin frequency shift with the temperature or strain.

The demodulation principle of between the Brillouin frequency shift and temperature or/and strain is as following:

The linear relation between the variation of Brillouin frequency shift $\Delta v_B$ and temperature or/and strain is written as:

$$\Delta v_B = C_{vT}\Delta T + C_{v\epsilon}\Delta\epsilon \qquad (2)$$

Where, $\Delta T$ and $\Delta\epsilon$ are the variations of temperature and strain, respectively. $C_{vT}$ and $C_{v\epsilon}$ are respectively temperature coefficient and strain coefficient. These coefficients can be scaled by the given conditions experiments. The distributed optical fiber temperature or strain sensing can be realized using the measured variation of Brillouin frequency shift according to the relations of Eq.(2).

Pulse coding and decoding principle are as following:

The coded pump optical pulses mentioned in present invention is generated by using the correlation sequences to modulate the CW light from the narrow linewidth laser 10, these correlation sequences contains two or more "−1" and "1", and the autocorrelative function of these correlation sequences is an integer multiple of the δ function. When the sequences contains the element "−1", a bipolar sequence can be expressed as the difference of two unipolar sequences because the unipolarity of optical pulse. And the system response of bipolar sequence can be expressed as the system response difference between the two unipolar sequences.

Hadamard train or Golay complementary sequences are often used correlation sequences. They have good correlation. According to the principle of coded pulses, the SNR improvement when using the N order Hadamard train or Golay complementary sequences can be respectively expressed as:

$$G_H = \frac{N^2}{(2N-1)\sqrt{N}} \qquad (3)$$

$$G_G = \frac{\sqrt{N}}{2} \qquad (4)$$

The break interrogation principle are as following:

When there is a break in the fiber under test (FUT) 18, the coded pump optical pulses with the Hadamard train or Golay complementary sequences outputting from the first electro-optic modulators 13 are now used as the probe optical pulse. Its backward Rayleigh scattering is directed into 3 dB coupler 20 through the third port of the optical circulator 19 and mixed with the local oscillator light, and then is coherent detected by the balance photodetector (PD) 21. The electrical spectrum analyzer (ESA) 22 in zero-span mode is used to acquire time-domain traces of the beat signal for the frequency $f_{IF}=f_1$ and the OTDR power distribution curve can be measured after averaging the data, and break interrogation can be realized.

The present invention simultaneously employs the combined method of optical pulse coding techniques and coherent detection, which can enhance the SNR of BOTDA system, improve the measurement accuracy of temperature and strain and increase the sensing length. The Hadamard train or Golay complementary sequences are used for the coded pump optical pulses, which can enhance both the SNR and spatial resolution of BOTDA. The width of code element can be small enough to the phonon life 10 ns, corresponding to 1 m spatial resolution. The combined methods of optical pulse coding techniques and coherent detection can endow BOTDA system with the capacity of break interrogation, which offers an excellent solution for the requisite of two-end-access in BOTDA, and significantly enhances the robustness of the sensing system.

Figure 2:
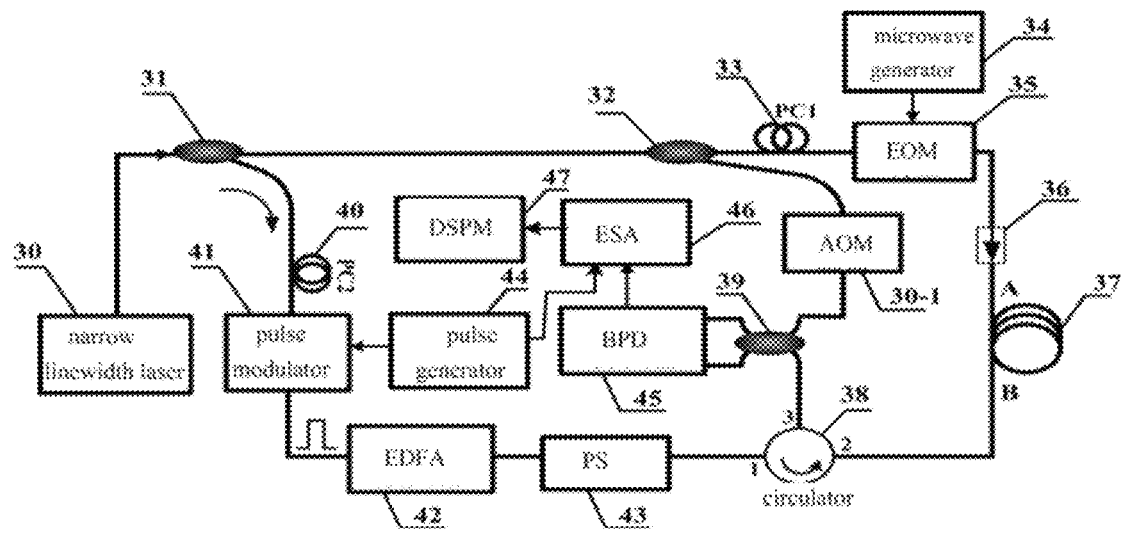
FIG. 2 is a block diagram of an example long distance BOTDA sensing system combined COTDR and coherent detection.

A specific example long distance BOTDA sensing system combined COTDR and coherent detection of the present invention referring to FIG. 2 are as following:

A laser 30 with the linewidth less than 1 MHz emits 1550 nm CW light, and the power of the output is 16 dBm. Then the CW light is divided into two branches by the first coupler 31: a first branch CW light and a second branch CW light. The first branch is modulated by a pulse modulator 41 controlled by a pulse generator 44 to generate 50 ns pump pulses. The pulse modulator 41 is an electro-optic intensity modulator and with a high extinction ratio of 40 dB. Due to the polarization sensitivity of electro-optic intensity modulator, a polarization controller 40 is set before the pulse modulator 41 to reduce the influence of the polarization state of input light. Then generated pump pulses are amplified at a required optical power level (peak power of 20 dBm) by an Erbium doped fiber amplifier (EDFA) 42 and then is directed into the first port of the optical circulator 38 after passing the polarization scrambler (PS) 43 and input into the one end of the end B of the long distance sensing fiber 37 through the second port of the optical circulator 38.

The second branch CW light is again separated into two branches by the second coupler 32. Wherein the lower branch CW light is used as the local oscillator light after shifted frequency $f_1=80$ MHz by an acousto-optic modulator (AOM) 30-1. In the upper branch, the probe signal light is generated from the upper branch CW light after a frequency shifting f by the electro-optic modulator (EOM) 35, operating in the suppressed carrier regime, controlled by the microwave generator 34. The frequency shifting f approximates the Brillouin frequency shift of the long distance sensing fiber 37. A polarization controller 33 is set before the pulse modulator 35 to reduce the influence of the polarization state of input light.

The generated probe signal light is two symmetrical sidebands. The frequency difference between the two sidebands and the original CW light is about 11 GHz. Then the double sidebands method is used to mitigate nonlocal effects induced by the pump depletion. i.e. the two sidebands are launched into the A end of the long distance sensing fiber 37 after passing the optical isolator 36, and then interact with the pump pulses through stimulated Brillouin scattering (SBS). The two interacted probe sidebands passing through the third port of the optical circulator 38 are directed to the 3-dB coupler 39 to mix with the local oscillator light, and then are detected by the balance photodetector (PD) 45. The output of the balance photodetector (PD) 45 is observed and collected by the electrical spectrum analyzer (ESA) 46, and the digital signal processing module 47 deals with the IF signals from the ESA 46 to obtain the Brillouin gain spectrum and makes the Lorentz fitting of the obtained spectrum to obtain the Brillouin frequency shift distribution. Finally the distributed optical fiber temperature or strain sensing can be realized using the measured Brillouin frequency shift according to the relations of the Brillouin frequency shift with the temperature or strain.

The present invention coherent detection BOTDA system is based on stimulated Brillouin effect, in which the double sidebands probe techniques and coherent detection are simultaneously used.

The aforementioned pulse generator 44 is used to control the pulse modulator 41 and to give synchronous trigger control for the electrical spectrum analyzer (ESA) 46 simultaneously.

The frequency of the output signal from the microwave generator 44 is about one Brillouin frequency shift of the long distance sensing fiber 37. The frequency offset of pump pulse and the probe beam is controlled by the microwave generator 44, and the Brillouin gain spectrum can be measured by scanning the frequency offset of pump pulse and the probe beam through adjusting the modulated frequency f of the microwave generator 44. The output of the balance photodetector (PD) 45 is observed and collected by the electrical spectrum analyzer (ESA) 46, and the digital signal processing module 47 deals with the IF signals from the ESA to obtain the Brillouin gain spectrum and then makes the Lorentz fitting of the obtained spectrum to obtain the Brillouin frequency shift distribution. Finally the distributed optical fiber temperature or strain sensing can be realized according to the relations of the Brillouin frequency shift with the temperature or strain.

Figure 3:
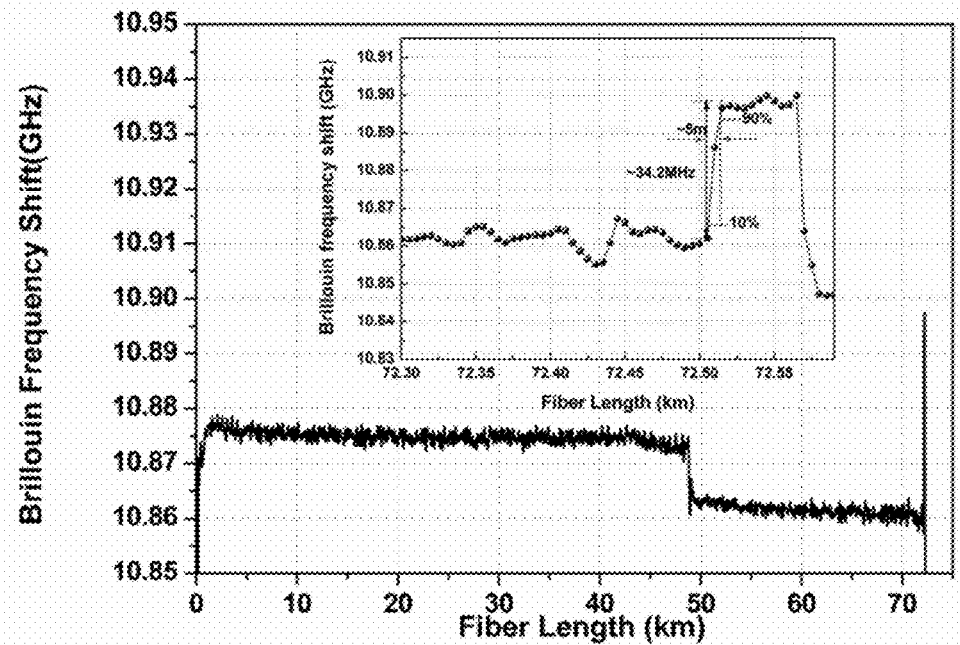
FIG. 3 is a measured Brillouin frequency shift versus the fiber length by using the long distance BOTDA sensing system combined COTDR and coherent detection according to an embodiment.

The BFS measured by the long distance BOTDA sensing system combined COTDR and coherent detection of the present invention is plotted in FIG. 3. The measured BFS is divided two segments. That is because the BFSs of the two segments is different, the length of the former segment is 48 km, and the latter is 24 km. The standard deviations of the measured BFS for the two sections sensing fiber (not including the heated 52 m fiber) are ±1.6 MHz and ±1.8 MHz, which correspond to the temperature accuracy of ±1.6° C. and ±1.8° C., respectively. The mean values of BFS for the first and the second segments are 10.8748 GHz and 10.8616 GHz, respectively. The difference of the measured mean BFS is about 13.2 MHz, which is in agreement with the expected value (~12 MHz). However, the maximum fluctuation on the BFS curve is up to 5 MHz. It is probably caused by the polarization-induced and phase noise that would appear in the conventional self-heterodyne scheme.

The inset of FIG. 3 is the partial enlargement near the end of the sensing fiber, wherein the different temperature between the last 50 m long fiber and the other sensing fiber is about 32.7° C. The frequency difference between the heated and the unheated sections is approximately 34.2 MHz, considering the sensitivity of 1.1 MHz/° C. in the BFS, this gives us a temperature variation of 31.1° C., which is in good agreement with the expected temperature difference (31.7° C.).

Figure 4:
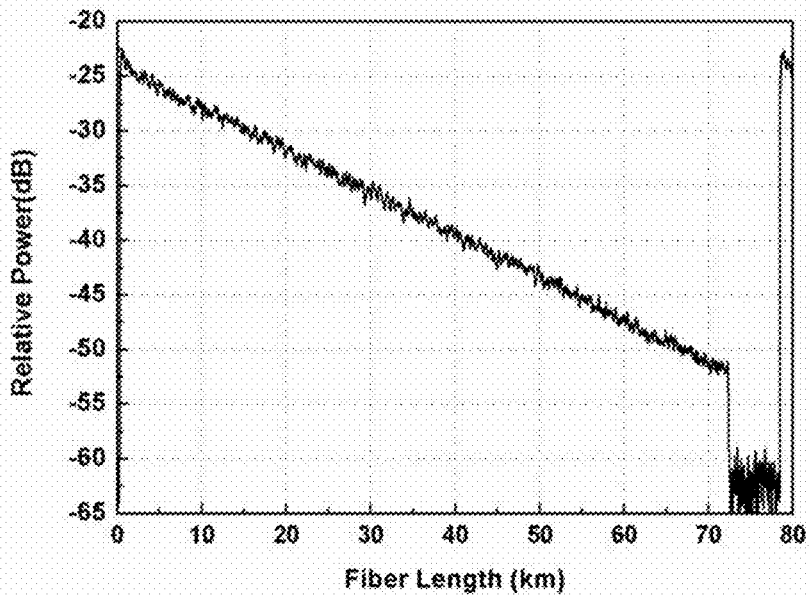
FIG. 4 is an example COTDR measurement result for 72 km sensing length with 1 µs pulse, corresponding to 100 m spatial resolution, when the probe A-end of the FUT is disconnected.

Further, in the above long distance BOTDA sensing system combined COTDR and coherent detection, when there is a break in the long distance sensing fiber 37, the pump optical pulses modulated by the pulse modulator 41 are now used as the probe optical pulse, its backward Rayleigh scattering is directed into 3 dB coupler 39 through the third port of the optical circulator 38 and mixed with the local oscillator light, and then is coherent detected by the balance photodetector (PD) 45. The electrical spectrum analyzer (ESA) 46 in zero-span mode is used to acquire time-domain traces of the beat signal for the frequency $f_{IF}$=80 MHz and the OTDR power distribution curve can be measured after averaging the data, and break interrogation of the COTDR can be realized. The COTDR trace is measured and shown in FIG. 4 when the probe input-end of the FUT is disconnected.

It can enhance the SNR and dynamic range of BOTDA system by using the coherent detection to replace the traditional direct detection method. The using of the double sideband (DSB) method can mitigate nonlocal effects and improve the measurement accuracy for long distance measurement. Another advantage of our configuration is that the sensor has the capacity of break interrogation as COTDR when the break occurs in sensing fiber, which offers an excellent solution for the requisite of two-end-access in BOTDA, and significantly enhances the robustness of the sensing system.

What is claimed is:

1. A Brillouin Optical Time-Domain Analyzer (BOTDA) system that combined optical pulse coding techniques and coherent detection, comprising:

a narrow linewidth laser, a first polarization-maintaining coupler, a second polarization-maintaining coupler, a microwave generator, fiber under test (FUT), an optical circulator, a 3 dB coupler, a balance photodetector, a polarization scrambler (PS), an electrical spectrum analyzer and a digital signal processing unit; the output of the narrow linewidth laser is divided into two branches by the first polarization-maintaining coupler: a first branch CW light and a second branch CW light; characterized in that: the BOTDA system also comprises a frequency shifter, a first electro-optic modulators (EOM1), a pulse generator and a second electro-optic modulator (EOM2); wherein:

the first branch CW light is used as the local oscillator light after shifted frequency $f_1$ by the frequency shifter;

the second branch CW light is again separated into two branches by the second polarization-maintaining coupler (PMC2); the lower branch is modulated by the pulse generator to generate coded pump pulses via the first electro-optic modulator (EOM1); then generated coded pump pulses are directed into the first port of the optical circulator and input into the one end of the FUT through the second port of the optical circulator;

in the upper branch, the probe signal light is generated after a frequency shifting f by the second electro-optic modulator (EOM2), operating in the suppressed carrier regime, controlled by the microwave generator; the generated probe signal light is two symmetrical sidebands; then the two sidebands are launched into the other end of the FUT, and then interact with the coded pump pulses through stimulated Brillouin scattering (SBS); the two interacted probe sidebands passing through the third port of the optical circulator are directed to the 3-dB coupler to mix with the OLO light, and then are detected by the balance photodetector (PD) (21); the output of the balance photodetector (PD) is observed and collected by the electrical spectrum analyzer (ESA), and the digital signal processing unit process the IF signals from the ESA to obtain the Brillouin gain spectrum and then makes the Lorentz fitting of the obtained spectrum to get the Brillouin frequency shift distribution; finally the distributed optical fiber temperature or strain sensing can be realized using the measured Brillouin frequency shift according to the relations of the Brillouin frequency shift with the temperature or strain.

2. The BOTDA system that combined optical pulse coding techniques and coherent detection according to claim 1, wherein frequency response range of the balance photodetector is larger than 12 GHz.

3. The BOTDA system that combined optical pulse coding techniques and coherent detection according to claim 1, wherein the frequency shifter has more than 80 MHz shifted frequency range.

4. The BOTDA system that combined optical pulse coding techniques and coherent detection according to claim 1, wherein the digital signal processing unit controls the pulse generator to generate coded electrical pulses with the Hadamard train or Golay complementary sequences, and provide synchronous control for the electrical spectrum analyzer (ESA).

5. The BOTDA system that combined optical pulse coding techniques and coherent detection according to claim 1, wherein the first electro-optic modulators (EOM1) is controlled by the pulse generator, its output are the coded pump optical pulses with the Hadamard train or Golay complementary sequences.

6. The BOTDA system that combined optical pulse coding techniques and coherent detection according to claim 1, wherein when there is not break in the fiber under test (FUT), the detected alternating photocurrent of the beat signals outputting from the balance photodetector (PD) is:

$$i_{det}(t)=2R\sqrt{P_L P_p(1+g_{SBS}(v_s,z))^2}\times\cos(2\pi f_{IF}t+\Delta\phi)$$

where, $g_{SBS}$ is the stimulated Brillouin gain, R is the responsibility of the balance photodetector (PD), $P_L$ and $P_p$ are powers of the optical local oscillator (OLO) and the probe light, respectively, $f_{IF}$ is the frequency of the beat signal (also called intermediate frequency, IF), $\Delta\phi$ is the phase difference between the optical local oscillator and the probe light; when there is a break in the fiber under test (FUT); the coded pump optical pulses with the Hadamard train or Golay complementary sequences outputting from the first electro-optic modulators (EOM1) are now used as the probe optical pulse, its backward Rayleigh scattering is directed into 3 dB coupler through the third port of the optical circulator and mixed with the OLO, and then is coherent detected by the balance photodetector (PD); the electrical spectrum analyzer (ESA) in zero-span mode is used to acquire time-domain traces of the beat signal for the frequency $f_{IF}=f_1$ and the OTDR power distribution curve can be measured after averaging the data, and break interrogation can be realized.

7. The BOTDA system that combined optical pulse coding techniques and coherent detection according to claim 1, wherein the center frequency of the electrical spectrum analyzer (ESA) is set up at intermediate frequency $f_{IF}$ and the ESA is operating in the "zero-span" mode; the output IF signal from the ESA then is decoded and averaged by the digital signal processing unit to obtain the time-domain power curve of the intermediate frequency $f_{IF}$ signal.

8. The BOTDA system that combined optical pulse coding techniques and coherent detection according to claim 1, wherein the Brillouin gain spectrum can be measured by scanning the frequency offset of pump pulse and the probe beam through adjusting the modulated frequency f of the microwave generator.

9. A long distance Brillouin Optical Time-Domain Analyzer (BOTDA) sensing system combined Optical time domain reflectometer based on coherent detection (COTDR) and coherent detection, comprising:
a narrow linewidth laser, a first coupler, a second coupler, a microwave generator, an electro-optic modulators (EOM), an optical isolator, long distance sensing fiber, an optical circulator, a 3 dB coupler, a pulse modulator, erbium-doped fiber amplifier (EDFA), a polarization scrambler (PS), a pulse generator, a balance photodetector, an electrical spectrum analyzer and a digital signal processing module; wherein:
the output of the narrow linewidth laser is divided into two branches by the first coupler: a first branch CW light and a second branch CW light;
the first branch is modulated by the pulse generator to generate pump pulses via the pulse modulator; then generated coded pump pulses are amplified at a required optical power level by an Erbium doped fiber amplifier (EDFA) and directed into the first port of the optical circulator after passing the polarization scrambler (PS) and input into the one end of the end B of the long distance sensing fiberthrough the second port of the optical circulator;
the second branch CW light is again separated into two branches by the second coupler; wherein the lower branch CW light is used as the local oscillator light after shifted frequency $f_1$ by an acousto-optic modulator (AOM);
in the upper branch, the probe signal light is generated after a frequency shifting f by the electro-optic modulator (EOM), operating in the suppressed carrier regime, controlled by the microwave generator; the generated probe signal light is two symmetrical sidebands; then the two sidebands are launched into the "A" end of the long distance sensing fiber after passing the optical isolator, and then interact with the pump pulses through stimulated Brillouin scattering (SBS); the two interacted probe sidebands passing through the third port of the optical circulator are directed to the 3-dB coupler to mix with the OLO light, and then are detected by the balance photodetector (PD); the output of the balance photodetector (PD) is observed and collected by the electrical spectrum analyzer (ESA), and the digital signal processing module deals with the IF signals from the ESA to obtain the Brillouin gain spectrum and then makes the Lorentz fitting of the obtained spectrum to obtain the Brillouin frequency shift distribution; finally the distributed optical fiber temperature or strain sensing can be realized using the measured Brillouin frequency shift according to the relations of the Brillouin frequency shift with the temperature or strain.

10. A long distance BOTDA sensing system combined COTDR and coherent detection according to claim 9, wherein when there is a break in the long distance sensing fiber, the pump optical pulses modulated by the pulse modulator are now used as the probe optical pluses, its backward Rayleigh scattering is directed into 3 dB coupler through the third port of the optical circulator and mixed with the OLO, and then is coherent detected by the balance photodetector (PD); the electrical spectrum analyzer (ESA) in zero-span mode is used to acquire time-domain traces of the beat signal for the frequency $f_{IF}=f_1$ and the OTDR power distribution curve can be measured after averaging the data, and break interrogation of the COTDR can be realized.

* * * * *